(12) United States Patent
Wang et al.

(10) Patent No.: US 9,068,025 B2
(45) Date of Patent: Jun. 30, 2015

(54) CATALYST COMPONENT FOR POLYMERIZATION OF OLEFIN AND PREPARATION METHOD

(75) Inventors: Shibo Wang, Beijing (CN); Dongbing Liu, Beijing (CN); Junling Zhou, Beijing (CN); Xinping Lü, Beijing (CN); Lei Zhang, Beijing (CN); Bingquan Mao, Beijing (CN); Baoquan Xing, Beijing (CN); Xin Zhou, Beijing (CN); Changli Zhang, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 130 days.

(21) Appl. No.: 13/817,610

(22) PCT Filed: Aug. 19, 2011

(86) PCT No.: PCT/CN2011/001389
§ 371 (c)(1),
(2), (4) Date: Feb. 19, 2013

(87) PCT Pub. No.: WO2012/022127
PCT Pub. Date: Feb. 23, 2012

(65) Prior Publication Data
US 2013/0150540 A1   Jun. 13, 2013

(30) Foreign Application Priority Data

| Aug. 19, 2010 | (CN) | 2010 1 0259366 |
|---|---|---|
| Aug. 19, 2010 | (CN) | 2010 1 0259382 |
| Aug. 19, 2010 | (CN) | 2010 1 0259608 |
| Aug. 19, 2010 | (CN) | 2010 1 0259614 |
| Aug. 19, 2010 | (CN) | 2010 1 0259632 |
| Aug. 19, 2010 | (CN) | 2010 1 0259648 |
| Oct. 19, 2010 | (CN) | 2010 1 0511306 |
| Oct. 19, 2010 | (CN) | 2010 1 0511310 |
| Oct. 19, 2010 | (CN) | 2010 1 0511337 |
| Oct. 19, 2010 | (CN) | 2010 1 0511365 |
| Oct. 19, 2010 | (CN) | 2010 1 0511375 |
| Oct. 19, 2010 | (CN) | 2010 1 0511404 |

(51) Int. Cl.
*C08F 4/649* (2006.01)
*C08F 10/00* (2006.01)

(52) U.S. Cl.
CPC .............. *C08F 4/6494* (2013.01); *C08F 10/00* (2013.01)

(58) Field of Classification Search
CPC ...... C08F 4/6494; C08F 4/649; C08F 4/6491; C08F 4/6492; C08F 10/00
USPC .............................. 526/124.2; 502/111, 115
See application file for complete search history.

(56) References Cited

U.S. PATENT DOCUMENTS

| 3,787,384 A | 1/1974 | Stevens et al. |
|---|---|---|
| 4,148,754 A | 4/1979 | Strobel et al. |
| 4,173,547 A | 11/1979 | Graff |
| 4,301,029 A | 11/1981 | Caunt et al. |
| 4,387,201 A | 6/1983 | Bahadir et al. |
| 4,508,843 A | 4/1985 | Etherton et al. |
| 4,921,920 A | 5/1990 | Collomb-Ceccarini et al. |
| 4,940,682 A | 7/1990 | Sasaki et al. |
| 5,124,296 A | 6/1992 | Chamla et al. |
| 5,298,474 A | 3/1994 | Luciani et al. |
| 6,034,026 A | 3/2000 | Garoff et al. |
| 6,218,331 B1 | 4/2001 | DiMaio et al. |
| 6,545,106 B1 | 4/2003 | Bian et al. |
| 2004/0242407 A1 | 12/2004 | Denifl et al. |
| 2005/0020785 A1 | 1/2005 | Lindroos et al. |
| 2007/0032618 A1 | 2/2007 | Varzeshkhah et al. |

FOREIGN PATENT DOCUMENTS

| CN | 1129709 A | 8/1996 |
|---|---|---|
| CN | 1138589 A | 12/1996 |
| CN | 1158136 A | 8/1997 |
| CN | 1299375 A | 6/2001 |
| CN | 1359395 A | 7/2002 |

| | | | |
|---|---|---|---|
| CN | 1537118 A | 10/2004 |
| CN | 1746197 A | 3/2006 |
| CN | 1795213 A | 6/2006 |
| CN | 1948351 A | 4/2007 |
| CN | 101245115 A | 8/2008 |
| CN | 101260166 A | 9/2008 |
| CN | 101633704 A | 1/2010 |
| EP | 0 258 089 A1 | 3/1988 |
| EP | 1 233 029 A1 | 8/2002 |
| EP | 1 187 857 B1 | 1/2004 |
| JP | H0211610 A | 1/1990 |
| JP | H02269104 A | 11/1990 |
| JP | 2657666 B2 | 9/1997 |
| WO | WO 00/73355 A1 | 12/2000 |
| WO | WO 02/085958 A2 | 10/2002 |

OTHER PUBLICATIONS

PCT International Preliminary Report on Patentability dated Feb. 19, 2013, issued in International Application No. PCT/CN2011/001389.
International Search Report dated Nov. 24, 2011, issued in International Application No. PCT/CN2011/001389.
PCT Written Opinion of the International Searching Authority dated Nov. 24, 2011, issued in International Application No. PCT/CN2011/001389.
Extended European Search Report dated Jul. 9, 2014, issued in European Patent Applications No. 11817655.1, 4 pages.

*Primary Examiner* — Ling Choi
*Assistant Examiner* — Catherine S Branch
(74) *Attorney, Agent, or Firm* — Finnegan, Henderson, Farabow, Garrett & Dunner, LLP

(57) ABSTRACT

The present invention relates to a catalyst component for olefin polymerization, which comprises the reaction product of at least one organo-magnesium compound, at least one titanium-containing compound, at least one hydroxyl group-containing compound, at least one chlorine-containing organo-aluminum, boron, phosphorus or silicon compound, and at least one polybutadiene block copolymer. The catalyst component of the present invention has well-shaped particles, and a narrow particle size distribution; a polymerization reaction of olefins with the catalyst component produces well-shaped polymer particles with a high bulk density (BD) and an excellent comprehensive catalytic performance. The present invention also relates to a preparation method for said catalyst component and the application thereof, particularly in the homopolymerization and copolymerization of olefins such as ethylene, propylene, butene, hexene and octene.

32 Claims, 2 Drawing Sheets

CATALYST COMPONENT FOR POLYMERIZATION OF OLEFIN AND PREPARATION METHOD

CROSS REFERENCE TO RELATED APPLICATION

This application is a national phase application based on PCT/CN2011/001389, filed Aug. 19, 2011, which claims the priority of Chinese Patent Application Nos. 201010259608.8, filed Aug. 19, 2010, 201010259614.3, filed Aug. 19, 2010, 201010259632.1, filed Aug. 19, 2010, 201010259648.2, filed Aug. 19, 2010, 201010259366.2, filed Aug. 19, 2010, 201010259382.1, filed Aug. 19, 2010, 201010511365.2, filed Oct. 19, 2010, 201010511375.6, filed Oct. 19, 2010, 201010511404.9, filed Oct. 19, 2010, 201010511306.5, filed Oct. 19, 2010, 201010511310.1, filed Oct. 19, 2010, and 201010511337.0, filed Oct. 19, 2010, the contents of all of which are incorporated herein by reference.

TECHNICAL FIELD

The present invention relates to a catalyst component for olefin homopolymerization or copolymerization and a catalyst comprising said catalyst component. The present invention also relates to the preparation method of said catalyst component and its use.

TECHNICAL BACKGROUND

The polyolefin industry in the world has greatly developed since the successful development of highly efficient catalysts for polyolefin production in the 1970s. Over the past 20 years, a considerable progress has been made in the catalysts industry which is comparable with the development of the olefin polymerization process. The highly efficient catalysts by virtue of good polymerization performances and mature application technologies still play an important role in the olefin polymerization field. After many exploratory researches over the years, the preparation method of highly efficient Mg—Ti catalysts has been developed from the co-milling method, the suspension impregnation method to the chemical reaction method. Said chemical reaction method has been adopted by various patents relating the use of chemical raw materials such as organo-magnesium compounds, chlorating agents and the transition metal Titanium compounds in preparing various types of catalysts as disclosed in CN1158136, CN1299375, CN1795213, U.S. Pat. No. 3,787,384, U.S. Pat. No. 4,148,754, U.S. Pat. No. 4,173,547, U.S. Pat. No. 4,301,029, U.S. Pat. No. 4,508,843, U.S. Pat. No. 4,921,920 and U.S. Pat. No. 5,124,296. One fatal defect in preparing the Mg—Ti catalysts in such a way is that the forming steps, and thus the shape of the prepared catalyst granules are difficult to be controlled.

In recent development, some materials like emulsifiers are added to the dispersed system of the catalyst precursor comprising Mg/Ti compounds to form an emulsion, and after reaction, the catalyst particles are precipitated out, such that the shape of the obtained catalyst granules can be improved. For example, perfluoropolyether is used in EP0258089A, and perfluorooctane is used in CN 1537118A. The above methods are still of complex forming steps and difficult controlling. The shape of the obtained catalyst granules is also difficult to be controlled, and the used materials are of high cost and difficult to be obtained.

Besides, recent researches show that adding electron donors in preparing a catalyst component can adjust the polymerization activity and the hydrogen response of the catalyst, reduce the oligomers content in the polymerization products, and so on. In CN1129709A, electron donor compounds are used in the preparation of the catalyst to improve the activity and hydrogen response of a catalyst and the block density of polymerization products. The electron donor compounds used in said patent comprises organic compounds with a pair or many pairs of free electrons, mainly organic acid esters.

In conclusion, although various researches have been made in the Zinger-Natta catalyst field, a catalyst of a simple preparation method, an excellent granule shape, a high catalytic activity and a good hydrogen response is still needed in the field.

SUMMARY OF INVENTION

The present invention aims to prepare a solid particle of Zinger-Natta catalyst in a controlled manner so as to obtain a catalyst component with a good particle shape (such as spherical particles), a narrow particle size distribution, a high catalyst activity and a good hydrogen response, which will be beneficial for the use of catalyst in polymerization devices such as gas-phase and slurry process, and the preparation method of the catalyst is simple and easy to operate.

The present invention provides a catalyst component for olefin polymerization, which comprises the reaction product of at least one organo-magnesium compound, at least one titanium-containing compound, at least one hydroxyl group-containing compound, at least one chlorine-containing organic compound, and at least one polybutadiene block copolymer, wherein said organo-magnesium compound is as shown in Formula (I) $MgR^1{}_nCl_{2-n}$, wherein $R^1$ is $C_1$-$C_{20}$ hydrocarbyl group, and can be saturated or unsaturated straight chain, branched chain or cyclo-chain, and $0 < n \le 2$; preferably, $R^1$ is $C_2$-$C_{20}$ alkyl group, and the specific compound can be selected from at least one of dibutyl magnesium, diisobutyl magnesium, dioctyl magnesium, butyl octyl magnesium, ethyl magnesium chloride and butyl magnesium chloride;

wherein said titanium-containing compound is as shown in Formula (II) $Ti(OR^2)_mCl_{4-m}$, wherein $R^2$ is $C_2$-$C_{20}$ hydrocarbyl group, and can be saturated or unsaturated straight chain, branched chain or cyclo-chain, and $0 \le m \le 4$; preferably, m is 4 or 0, because tetravalent titanium compounds are commonly liquid at room temperature, and their compatibility with some solvents is also good; the specific compound is selected from at least one of titanium tetrachloride, tetraethyl titanate and tetrabutyl titanate, preferably titanium tetrachloride;

wherein said hydroxyl group-containing compound is as shown in Formula (III) $HOR^3$, wherein $R^3$ is $C_2$-$C_{20}$ hydrocarbyl group, and can be saturated or unsaturated straight chain, branched chain or cyclo-chain; said hydroxyl group-containing compound is preferably fatty alcohol or aromatic alcohol, further preferably selected from at least one of n-butanol, n-hexanol, isooctanol, benzyl alcohol and phenyl ethanol.

Preferably, said co-forming-precipitation agent polybutadiene block copolymer is the polystyrene-block-polybutadiene (SB) copolymer, comprising the diblock copolymer, the triblock copolymer (SBS, BSB) and the derivatives thereof. The block type can be optionally a liner type, a type comprising branched chain or a star type; the content of polybutadiene in said polybutadiene block copolymer is 3 to 97% (wt %), preferably 10 to 90% (wt %).

Preferably, said co-forming-precipitation agent polybutadiene block copolymer is the polybutadiene-block-polyethylene oxide (PB-b-POE) copolymer, comprising the diblock compolymer, the triblock copolymer (PB-b-POE-b-PB, POE-b-PB-b-POE) and the derivatives thereof. The block type can be optionally a linear type, a type comprising branched chain or a star type, etc.; the content of polybutadiene in said polybutadiene block copolymer is 3 to 97% (wt), preferably 10 to 90% (wt).

Preferably, said chlorine-containing organic compound is the chlorine-containing organo-boron compound as shown in Formula (IV) $BR^4_p Cl_{3-p}$, wherein $R^4$ is $C_2$-$C_{20}$ alkyl or alkoxy group, and $0 \leq p < 3$; the specific chlorine-containing organo-boron compound is selected from at least one of dichloro-methyl boron, dichloro-ethyl boron, dichloro-butyl boron, dichloro-methoxy boron, dichloro-ethoxy boron, boron trichloride and dichloro-butoxy boron, preferably selected from at least one of dichloro-butyl boron, dichloro-methoxy boron, dichloro-ethoxy boron, boron trichloride and dichloro-butoxy boron.

Preferably, said chlorine-containing organic compound is the chlorine-containing organo-phosphorus compound, which is $PCl_5$ or the compound as shown in Formula (V) $O_d PR^5_q Cl_{3-q}$, wherein $R^5$ is $C_2$-$C_{20}$ alkyl or alkoxy group, $0 \leq q < 3$, and d is 0 or 1; the specific chlorine-containing organo-phosphorus compound is selected from at least one of dichloro-methyl phosphorus, dichloro-ethyl phosphorus, dichloro-butyl phosphorus, phosphorus trichloride, phosphorus pentachloride, phosphorus oxychloride, methyl dichloro-phosphate, ethyl dichloro-phosphate and butyl dichloro-phosphate, preferably selected from at least one of phosphorus trichloride, phosphorus pentachloride, and phosphorus oxychloride.

Preferably, said chlorine-containing organic compound is the chlorine-containing organo-silicone compound as shown in Formula (VI) $SiR^6_e Cl_{4-e}$, wherein $R^6$ is $C_2$-$C_{20}$ alkyl or alkoxy group, and $0 \leq e < 4$; the specific chlorine-containing organo-silicone compound is selected from at least one of trichloro-phenyl silane, trichloro-methyl silane, trichloro-ethyl silane, trichloro-octyl silane, trichloro-methoxy silane, trichloro-ethoxy silane, trichloro-butoxy silane, dichloro-dimethoxy silane, dichloro-diethoxy silane and silicon tetrachloride, preferably selected from at least one of trichloro-methyl silane, trichloro-ethyl silane, trichloro-methoxy silane, trichloro-ethoxy silane and silicon tetrachloride.

Preferably, said chlorine-containing organic compound is the chlorine-containing organo-aluminum compound as shown in Formula (VII) $AlR^7_f Cl_{3-f}$, wherein $R^7$ is $C_2$-$C_{20}$ hydrocarbyl group, and $0.5 \leq f \leq 2.5$; preferably $R^7$ is $C_2$-$C_6$ straight chain or branched chain hydrocarbyl group; the specific organic aluminum compound comprising chlorine is selected from at least one of dichloro-ethyl aluminum, sesquiethyl aluminum chloride, diethyl aluminum chloride and dichloro-isobutyl aluminum.

Preferably, an acyl chloride compound is involved in the reaction to form a catalyst component. Said acyl chloride compound is as shown in Formula (VIII) $R^8 COCl$, wherein $R^8$ is $C_2$-$C_{20}$ hydrocarbyl group, and can be saturated or unsaturated straight chain, branched chain or cyclo-chain; said acyl chloride compound is selected from at least one of formyl chloride, acetyl chloride, propionyl chloride, butyryl chloride, benzoyl chloride, phenylacetyl chloride, phenylpropionyl chloride and phenylbutyryl chloride, preferably selected from at least one of formyl chloride, acetyl chloride, benzoyl chloride and phenylacetyl chloride.

Alternatively, preferably a silane compound is involved in the reaction to form a catalyst component. Said silane compound is as shown in Formula (IX) $Si(OR^9)_g Cl_{4-g}$, wherein $R^9$ is $C_2$-$C_{20}$ hydrocarbyl group, and can be saturated or unsaturated straight chain, branched chain or cyclo-chain, and $0 < g \leq 4$; said silane compound is selected from at least one of chloro-trimethoxy silane, chloro-triethoxy silane, chloro-tributoxy silane, dichloro-dimethoxy silane, dichloro-diethoxy silane, dichloro-dibutoxy silane, tetraethyl orthosilicate and tetrabutyl orthosilicate, preferably selected from at least one of chloro-triethoxy silane, chloro-tributoxy silane, tetraethyl orthosilicate and tetrabutyl orthosilicate.

The present invention also provides the corresponding preparation method for the above catalyst component.

The preparation method for said catalyst component in the present invention without the use of acyl chloride compound or silane compound comprises the following steps:

step a) the organo-magnesium compound is reacted with the hydroxyl group-containing compound to obtain a transparent solution;

step b) the polybutadiene block copolymer is dispersed in the $C_4$-$C_{20}$ alkane or aromatic solvent to form a solution, which is then reacted with the transparent solution obtained in step a) to produce a mixture; and step c) the chlorine-containing organic compound and titanium-containing compound are added into the mixture obtained in step b) in sequence to obtain said catalyst component.

The preparation method for said catalyst component in the present invention with the use of acyl chloride compound or silane compound comprises the following steps, step a) the organo-magnesium compound is reacted with the hydroxyl group-containing compound to obtain a transparent solution;

step b) the polybutadiene block copolymer is dispersed in the $C_4$-$C_{20}$ alkane or aromatic solvent to form a solution, which is then reacted with said acyl chloride compound or said silane compound and the transparent solution obtained in step a) to produce a mixture; and step c) the chlorine-containing organic compound and titanium-containing compound are added into the mixture obtained in step b) in sequence to obtain said catalyst component.

Preferably, in said preparation method, when calculated based on per mol of organo-magnesium compound, said titanium-containing compound is 0.01 to 10 mol, said hydroxyl group-containing compound is 0.1 to 20 mol, said chlorine-containing organic compound is 0.1 to 50 mol, said acyl chloride compound or said silane compound is 0.001 to 20 mol, and the content of said polybutadiene block copolymer in the reaction system is controlled within 0.001 to 100 g/L. It is preferable when said titanium-containing compound is 0.05 to 5 mol, said hydroxyl group-containing compound is 0.2 to 10 mol, said chlorine-containing organic compound is 0.5 to 20 mol, said acyl chloride compound or said silane compound is 0.01 to 10 mol, and the content of said polybutadiene block copolymer in the reaction system is controlled within 0.01 to 50 g/L.

In step a), the organo-magnesium compound and the hydroxyl group-containing compound react with each other favorably at a relatively higher temperature, preferably below the boiling temperature of the reactants, and generally not higher than 90° C. or 70° C. Depending on the nature of the reactants and the operation conditions, the required reaction time is generally from 5 min to 2 h, preferably from 10 min to 1 h. After the organo-magnesium compound reacts with the hydroxyl group-containing compound, the resulting solution is mixed with an inert diluent, which is commonly selected from aliphatic hydrocarbon, such as isobutane, pentane, hexane, heptane, cyclohexane and the mixture thereof. In general, hexane or heptane would be a suitable inert solvent.

In step b), the co-forming-precipitation agent polybutadiene block copolymer is dispersed in the $C_4$-$C_{20}$ alkane or aromatics solvent, preferably in the solvent of hexane, heptane, toluene or the mixture thereof, to form a solution, which is then mixed fully with (said acyl chloride compound or said silane compound and) the transparent solution obtained in step a). Based on the type and nature of the co-forming-precipitation agent, the prepared concentration of the $C_4$-$C_{20}$ alkane or aromatics solution is controlled within 0.1 to 100 g/L, preferably 1 to 50 g/L. The co-forming-precipitation agent should be added in the reaction system with such an amount that its content therein will be within 0.001 to 100 g/L, preferably 0.01 to 50 g/L. The temperature of the mixture is generally lower than the boiling temperature of the system. For convenience, it is generally selected within 0 to 90° C., preferably within 10 to 50° C. The mixing time is generally selected within 0.5 min to 5 h, preferably 10 min to 1 h.

In step c), the homogeneously mixing of all the materials is completed at a certain temperature. First, the temperature of the solution system obtained in the two preceding steps is lowered to a certain degree within −90 to 30° C., preferably −70 to 0° C., when the solution stays clear and transparent without the appearance of turbidity or precipitation. Then the chlorine-containing organic compound and the titanium-containing compound are added slowly in sequence, under fully stirring to facilitate the fully mixing of the materials, with a feeding rate not to cause obvious reaction or obviously warming of the system. After the materials are fully mixed, any known suitable method can be used to raise the temperature of the system, during which the system will be converted from clear to turbid, and the precipitate will come out. During the precipitation step, the reaction time should be long enough to obtain all the precipitates, which can be from 1 min to 10 h, preferably from 3 min to 5 h.

It is found by the test that, after the precipitation step, it is favorable for the catalyst particle shape to react for a period of time at a certain temperature for an aging treatment, which can improve the catalyst particle strength, thus reducing the particle crushing phenomenon of the catalyst in the polymerization procedure. The temperature of the aging treatment, which can be controlled within 0.5 to 10 h, preferably 1 to 5 h, is generally equal to or higher than the final temperature of precipitation reaction.

After the aging treatment, the precipitate is generally washed to remove excess reactants and the byproducts produced in the preparation procedure. Any inert solvent can be used in the washing step, such as isobutane, pentane, hexane, heptane, cyclohexane, toluene, various aromatics and the mixture thereof. In experiments, toluene is commonly selected to wash the precipitate twice, and then excessive hexane is used for fully washing, after which, the catalyst suspension is dried under nitrogen to obtain catalyst powders.

In addition, the present invention also relates to a catalyst for olefin homopolymerization or copolymerization, which comprises the reaction products of the above catalyst component according to the present invention and the alkyl aluminum compound, wherein the formula of the used alkyl aluminum compound is $AlR'''_3$, wherein $R'''_3$ can be one or more $C_1$-$C_8$ alkyl groups, which may be identical to or different from each other, and one or two alkyl groups can be substituted by chlorine atoms; one or more than two alkyl aluminum compounds can be selected and mixed for use, preferably from $AlEt_3$, $Al(iso-Bu)_3$, $Al(n-C_6H_{13})_3$, $Al(n-AlEt_2Cl$, and so on.

Said catalyst in the present invention can be used according to a known manner of the Zinger-Natta catalyst for olefin polymerization in the field. For example, it can be used together with another cocatalyst or electron donor, or with one or more kinds of Zinger-Natta catalysts or non-Ziegler-Natta catalysts.

As to the application of said catalyst in olefin homopolymerization or copolymerization, said olefin is ethylene, propylene, butylene, hexene or octene. Said catalyst of the present invention is applicable for various olefins which can coordinate the polymerization, comprising a homogenous polymerization of one olefin or a copolymerization of various olefins. The olefin is preferably α-olefin such as ethylene, propylene and butylene, or a mixture of ethylene, propylene, butylene with one or more kinds of α-olefins. The better comonomer is $C_2$-$C_{12}$ olefin, preferably $C_4$-$C_{12}$ olefin such as 1-butene, isobutene, 1-pentene, 1-hexene, 1-heptene, 1-octene, 1-nonene, 1-decene and 4-methyl pentene, diene such as butadiene, 1,4-hexadiene and 1,7-octadiene, and cycloolefin such as norbornene, and any mixture thereof.

Said catalyst in the present invention can be used in one or more polymerization reactors to carry out polymerization reaction by conventional polymerization technology. It can be a gas-phase, slurry or bulk polymerization reaction, and the polymerization reaction can be intermittent or unintermittent polymerization procedure.

As to the slurry or bulk reactor, the reaction temperature is generally within 40 to 130° C., preferably within 60 to 110° C.; the reaction pressure is generally within 0.1 to 8 MPa, preferably within 0.3 to 6 MPa; the residence time is generally within 0.2 to 6 h, preferably within 0.5 to 3 h. In general, an aliphatic hydrocarbon with the boiling point within −70 to 100° C. is selected as the dilute, and if required, the polymerization reaction can be carried out under supercritical conditions.

As to the gas-phase reactor, the reaction temperature is generally within 60 to 130° C., preferably within 70 to 110° C.; the reaction pressure is generally within 0.5 to 4 MPa, preferably within 1 to 3 MPa; the residence time is generally within 0.5 to 10 h, preferably within 1 to 8 h. If required, a suitable aliphatic hydrocarbon can be selected as the dilute, and the polymerization reaction can be carried out in a condensing state.

The catalyst dosage generally depends on the catalyst nature, the reactor type, the operation condition and the requirement for polymerization product properties. A conventional catalyst dosage can be used.

Using said catalyst in the present invention, a high catalyst activity and a good hydrogen response can be obtained, the polymerization product shape can copy the catalyst particle shape well, i.e. so-called "copy effect". Therefore, the catalyst provided by the present invention has good comprehensive performances.

EMBODIMENTS

Figure 1:
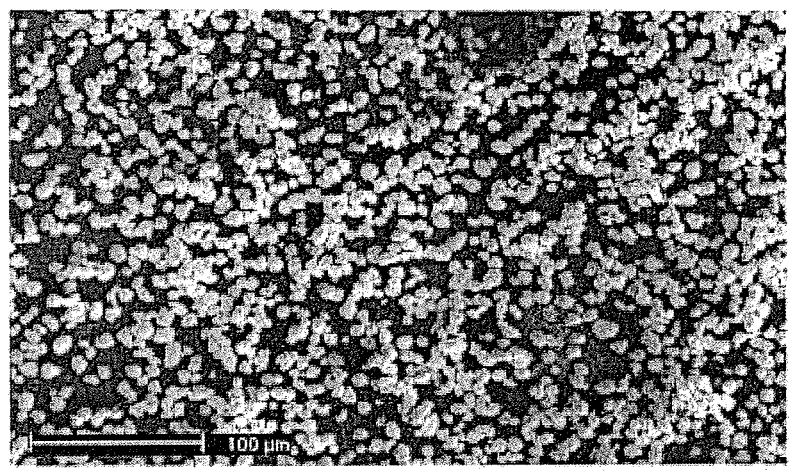
FIG. 1 shows the Scanning Electron Microscopy (SEM) photo of the catalyst component according to Example 10.

The present invention will be explained in detail by the following examples. Obviously, these examples do not restrict the scope of the present invention in any manner. The extent of protection of the present invention shall be determined by the terms of the claims.

The test methods in the examples of the present invention are as follows.

1. The particle size distribution of the carrier and the catalyst: using the particle size distribution meter, n-hexane as the dispersant, and the test range within 0.02 to 2000 m;
2. The weight ratio of metals (mainly magnesium and titanium) in the catalyst system: using Plasma emission spectroscopy (ICP);
3. The test of the melt index: ASTM-D 1238;
4. The test of the block density: DIN-53194.

Example 1

30 ml of hexane, 3.15 ml of hexane solution of dibutyl magnesium (1M) and 1.0 ml of isooctanol are weighed out in sequence and mixed, then the temperature is increased to 50° C. and the reaction is kept for 0.5 h under stirring to obtain a transparent solution. 3 ml of hexane solution (10 g/L) of the polystyrene-polybutadiene triblock copolymer (Kraton, FG1901X, in which the content of polybutadiene is 70%) is added. Then the temperature of the system is decreased to −50° C., and 3.15 ml of hexane solution of boron trichloride (1M) and 0.35 ml of titanium tetrachloride are added in sequence. After the feeding is completed, the temperature is increased quickly to 50° C. within 10 min and the reaction is kept for 2 h. The temperature of the catalyst suspension is decreased to room temperature, stood and precipitated, and then washed with hexane for 3 times with an amount of 50 ml each time. After the washing is completed, brown solid fluidity powders are obtained by drying, with an average particle size of 17.4 μm.

Element analysis (ICP): 10.62 wt % of Ti, 14.73 wt % of Mg.

Ethylene polymerization evaluation method A: 1 L of hexane, 1 mmol of triethyl aluminum and a certain amount of catalyst components are added into a 2 L steel stirred tank, then the temperature is increased to 85° C., 0.5 MPa of hydrogen is added in one time, and the system total pressure is kept at 1.03 MPa by ethylene to carry out the polymerization. After a reaction of 2 h, the adding of ethylene is stopped, the temperature is decreased and the pressure is released. The polyethylene powders are weighted, the catalyst activity is calculated, and the block density of polyethylene powders and the melt index of polyethylene powders at a load of 2.16 Kg are tested. The results are shown in Table 1.

Ethylene polymerization evaluation method B: 1 L of hexane, 1 mmol of triethyl aluminum and a certain amount of catalyst components are added into a 2 L steel stirred tank, the temperature is increased to 85° C., 0.18 Mpa of hydrogen is added in one time, and the system total pressure is kept at 1.03 MPa by ethylene to carry out the polymerization. After a reaction of 2 h, the adding of ethylene is stopped, the temperature is decreased and the pressure is released. The polyethylene powders are weighed, the catalyst activity is calculated, and the block density of polyethylene powders and the melt index of polyethylene powders at a load of 2.16 Kg are tested. The results are shown in Table 1.

Example 2

The amount of titanium tetrachloride in the preparation of catalyst is changed from 0.35 ml to 1 ml, other conditions being the same as those in Example 1. The average particle size is 13.6 μm.

Element analysis (ICP): 11.52 wt % of Ti, 12.43 wt % of Mg.

Ethylene polymerization evaluation methods A and B are the same as those in Example 1, and the polymerization results are as shown in Table 1.

Example 3

1.0 ml of isooctanol in the preparation of the catalyst is changed to 0.6 ml of n-octanol, and "the temperature is quickly increased to 50° C. within 10 min" is changed to "the temperature is increased to room temperature slowly and then heated to 50° C.". Other conditions are the same as those in Example 1, and the average particle size is 21.2 μm.

Element analysis (ICP): 11.25 wt % of Ti, 16.57 wt % of Mg.

Ethylene polymerization evaluation methods A and B are the same as those in Example 1, and the polymerization results are as shown in Table 1.

Comparative Example 1

The conditions are the same as in Example 1 except that the hexane solution of polystyrene-polybutadiene triblock copolymer is not added. The average particle size of the obtained catalyst is 68.53 μm, and the particle size distribution is a wider multimodal distribution.

Element analysis (ICP): 10.26 wt % of Ti, 14.18 wt % of Mg.

Ethylene polymerization evaluation methods A and B are the same as those in Example 1, and the polymerization results are as shown in Table 1.

TABLE 1

|  | Polymerization type | Activity (Kg polymer/ g cat.) | $MI_{2.16}$ (g/10 min) | Block density BD (g/ml) |
|---|---|---|---|---|
| Example 1 | Ethylene A | 6.8 | 98.72 | 0.30 |
|  | Ethylene B | 23.4 | 2.13 | 0.31 |
| Example 2 | Ethylene A | 9.8 | 86.38 | 0.29 |
|  | Ethylene B | 28.9 | 1.55 | 0.31 |
| Example 3 | Ethylene A | 9.1 | 36.73 | 0.30 |
|  | Ethylene B | 31.4 | 0.83 | 0.31 |
| Comparative Example 1 | Ethylene A | 5.7 | 72.59 | 0.28 |
|  | Ethylene B | 18.5 | 1.72 | 0.28 |

It can be seen from the data of examples and comparative example in Table 1 that, when the SBS co-forming-precipitation agents are used in the preparation of catalyst, the particle shape of the obtained catalyst and polymers is good, the particle size distribution is narrow, the block density (BD) of polymeric resin is high, and the catalyst comprehensive performance is good.

Example 4

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 3 ml of hexane solution (10 g/L) of the polystyrene-polybutadiene triblock copolymer (Kraton, FG1901X, in which the content of polybutadiene is 70%) is added, the temperature is decreased to −50° C., and 0.6 ml of hexane solution of phosphorus trichloride (1M) and 0.35 ml titanium tetrachloride are added in sequence. After the feeding is completed, the temperature is increased quickly to 50°

C. within 10 min and the reaction is kept for 2 h. The temperature of the catalyst suspension is decreased to room temperature, stood and precipitated, and then washed with hexane for 3 times, with an amount of 50 ml each time. After the washing is completed, brown solid fluidity powders are obtained by drying, with an average particle size of 17.6 μm.

Element analysis (ICP): 9.86 wt % of Ti, 12.69 wt % of Mg.

Ethylene polymerization evaluation methods A and B are the same as those in Example 1, and the polymerization results are as shown in Table 2.

Example 5

The amount of hexane solution (10 g/L) of polystyrene-polybutadiene triblock copolymer is changed from 3 ml to 6 ml, and 0.6 ml phosphorus trichloride is changed to 0.6 ml Phosphorus oxychloride. Other conditions are the same as those in Example 4, and the average particle size is Element analysis (ICP): 10.67 wt % of Ti, 13.58 wt % of Mg.

Ethylene polymerization evaluation methods A and B are the same as those in Example 1, and the polymerization results are as shown in Table 2.

Example 6

The amount of isooctanol in the catalyst preparation is changed from 1.0 ml to 3.0 ml, and "the temperature is increased quickly to 50° C. within 10 min" is changed to "the temperature is increased to room temperature slowly and then heated to 50° C.". Other conditions are the same as those in Example 4, and the average particle size is 19.7 μm.

Element analysis (ICP): 10.36 wt % of Ti, 14.62 wt % of Mg.

Ethylene polymerization evaluation methods A and B are the same as those in Example 1, and the polymerization results are as shown in Table 2.

Comparative Example 2

The conditions are the same as those in Example 4 except that the hexane solution of polystyrene-polybutadiene triblock copolymer is not added. The average particle size of the obtained catalysts is 64.76 μm, and the particle size distribution is a wider multimodal distribution.

Element analysis (ICP): 10.07 wt % of Ti, 13.16 wt % of Mg.

Ethylene polymerization evaluation methods A and B are the same as those in Example 1, and the polymerization results are as shown in Table 2.

TABLE 2

| | Polymerization type | Activity (Kg polymer/ g cat.) | $MI_{2.16}$ (g/10 min) | Block density (g/ml) |
|---|---|---|---|---|
| Example 4 | Ethylene A | 7.3 | 71.28 | 0.29 |
| | Ethylene B | 16.9 | 1.88 | 0.31 |
| Example 5 | Ethylene A | 11.7 | 82.59 | 0.30 |
| | Ethylene B | 26.7 | 1.34 | 0.31 |
| Example 6 | Ethylene A | 9.3 | 38.96 | 0.28 |
| | Ethylene B | 19.5 | 1.91 | 0.30 |
| Comparative Example 2 | Ethylene A | 5.9 | 68.32 | 0.26 |
| | Ethylene B | 14.6 | 1.67 | 0.27 |

It can be seen from the data of the examples and comparative example in Table 2 that, when the SBS co-forming-precipitation agents are used in the preparation of catalyst, the particle shape of the obtained catalyst and polymers is good, the particle size distribution is narrow, the block density (BD) of polymeric resin is high, and the catalyst comprehensive performance is good.

Example 7

30 ml of hexane, 3.15 ml of hexane solution of dibutyl magnesium (1M) and 1.0 ml isooctanol are weighed out in sequence and mixed, the temperature is increased to 50° C. and the reaction is kept for 0.5 h under stirring to obtain a transparent solution. Then 1 ml of hexane solution (10 g/L) of polystyrene-polybutadiene triblock copolymer (Kraton, FG1901X, in which the content of polybutadiene is 70%) is added, the temperature is decreased to −10° C., and 0.36 g of silicon tetrachloride and 0.35 ml of titanium tetrachloride are added in sequence. After the feeding is completed, the temperature is increased quickly to 50° C. within 10 min and the reaction is kept for 2 h. The temperature of the catalyst suspension is decreased to room temperature, stood and precipitated, and then washed with hexane for 3 times, with an amount of 50 ml each time. After the washing is completed, brown solid fluidity powders are obtained by drying with an average particle size of 56.2 μm.

Element analysis (ICP): 9.48 wt % of Ti, 20.84 wt % of Mg.

Ethylene polymerization evaluation methods A and B are the same as those in Example 1, and the polymerization results are as shown in Table 3.

Example 8

"The temperature is increased quickly to 50° C. within 10 min" is changed to "the temperature is increased quickly to 70° C. within 10 min". The other conditions are the same as those in Example 7, and the average particle size is 85.2 μm.

Element analysis (ICP): 5.12 wt % of Ti, 12.81 wt % of Mg.

Ethylene polymerization evaluation methods A and B are the same as those in Example 1, and the polymerization results are as shown in Table 3.

Example 9

1.0 ml of isooctanol in the catalyst preparation is changed to 0.6 ml of n-butanol, the amount of hexane solution (10 g/L) of polystyrene-polybutadiene triblock copolymer added is changed from 1 ml to 3 ml, and "the temperature is increased quickly to 50° C. within 10 min" is changed to "the the temperature is increased to room temperature slowly and then heated to 50° C.". Other conditions are the same as those in Example 7, and the average particle size is 24.3 μm.

Element analysis (ICP): 11.66 wt % of Ti, 24.39 wt % of Mg.

Ethylene polymerization evaluation methods A and B are the same as those in Example 1, and the polymerization results are as shown in Table 3.

Comparative Example 3

The conditions are the same as those in Example 7 except that the hexane solution of polystyrene-polybutadiene triblock copolymer is not added. The average particle size of the obtained catalyst is 79.46 μm, and the particle size distribution is a wider multimodal distribution.

Element analysis (ICP): 9.73 wt % of Ti, 21.06 wt % of Mg.

Ethylene polymerization evaluation methods A and B are the same as those in Example 1, and the polymerization results are as shown in Table 3.

TABLE 3

| | Polymerization type | Activity (Kg polymer/ g cat.) | MI$_{2.16}$ (g/10 min) | Block density (g/ml) |
|---|---|---|---|---|
| Example 7 | Ethylene A | 7.5 | 104.4 | 0.33 |
| | Ethylene B | 25.2 | 2.17 | 0.33 |
| Example 8 | Ethylene A | 5.9 | 93.26 | 0.30 |
| | Ethylene B | 10.8 | 1.64 | 0.31 |
| Example 9 | Ethylene A | 9.3 | 38.45 | 0.33 |
| | Ethylene B | 30.5 | 0.74 | 0.34 |
| Comparative Example 3 | Ethylene A | 6.4 | 87.38 | 0.28 |
| | Ethylene B | 22.6 | 1.49 | 0.29 |

It can be seen from the data of the examples and comparative example in Table 3 that, when the SBS co-forming-precipitation agents are used in the preparation of catalyst, the particle shape of the obtained catalyst and polymers is good, the particle size distribution is narrow, the block density (BD) of polymeric resin is high, and the catalyst comprehensive performance is good.

Example 10

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 2 ml of hexane solution (10 g/L) of the polystyrene-polybutadiene triblock copolymer (Kraton, FG1901X, in which the content of polybutadiene is 70%) is added, the temperature is decreased to −50° C., and 1.6 ml of hexane solution of ethyl aluminum dichloride (2M) and 0.35 ml of titanium tetrachloride are added in sequence. After the reaction is kept for 0.5 h at a low temperature, the temperature is increased slowly and naturally to room temperature, and then the reaction is carried out for 2 h at 50° C. The temperature of the catalyst suspension is decreased to room temperature, stood and precipitated, and then washed with hexane for 3 times with an amount of 50 ml each time. After the washing is completed, brown solid fluidity powders are obtained by drying with an average particle size of 15.6 μm. The electron microscopy photo of the catalyst component is shown in FIG. 1.

Element analysis (ICP): 11.04 wt % of Ti, 12.64 wt % of Mg.

Ethylene polymerization evaluation methods A and B are the same as those in Example 1, and the polymerization results are as shown in Table 4.

Example 11

The amount of hexane solution (10 g/L) of polystyrene-polybutadiene triblock copolymer is changed from 2 ml to 4 ml, and the other conditions are the same as those in Example 10. The average particle size is 7.69 μm.

Element analysis (ICP): 10.02 wt % of Ti, 14.20 wt % of Mg.

Ethylene polymerization evaluation methods A and B are the same as those in Example 1, and the polymerization results are as shown in Table 4.

Example 12

"The reaction is kept for 0.5 h at a low temperature, and the temperature is increased slowly and naturally to room temperature" is adjusted to "after the feeding is completed, the temperature is increased to 50° C. within 10 min". The other conditions are the same as those in Example 10, and the average particle size is 21.5 μm.

Element analysis (ICP): 12.65 wt % of Ti, 9.86 wt % of Mg.

Ethylene polymerization evaluation methods A and B are the same as that in Example 1, and the polymerization results are as shown in Table 4.

Propylene polymerization evaluation method: into a 2 L steel reactor which is fully replaced by propylene gas, and then 800 ml of hexane, 2.5 mmol of triethyl aluminum, 0.125 mmol of diphenyl dimethoxy silane (DDS) and 20 mg of catalyst components prepared in Example 12 are added. After 0.4 NL of (standard liter) hydrogen is added, propylene is fed to keep the pressure in the reactor at 0.6 MPa when the temperature is increased to 70° C. The polymerization is carried out for 2 h, then the pressure is released and the products are discharged. The congruent isotacticity of the obtained polymers (the content of the residual substance after extracted with boiling heptane in an extractor for 6 hours) is 91.7%, and the specific polymerization results are shown in Table 4.

Example 13

Figure 2:
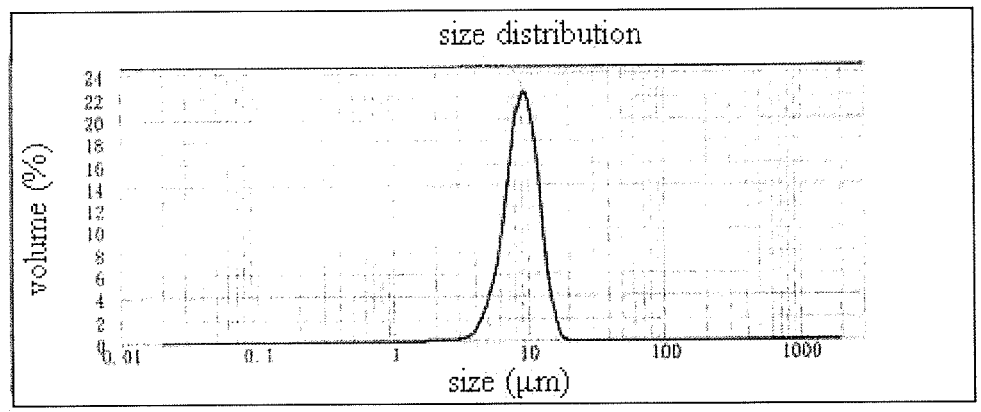
FIG. 2 shows the Particle size distribution diagram according to Example 13.
Figure 3:
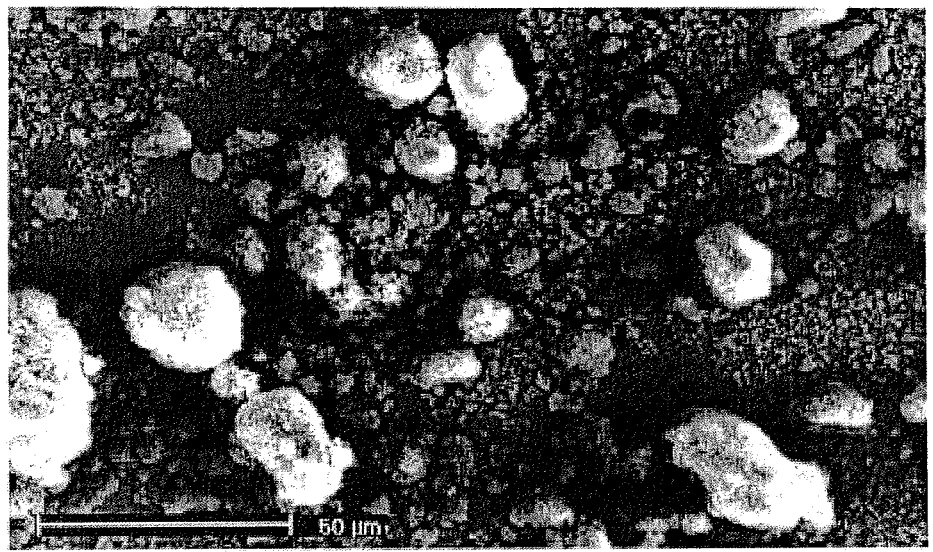
FIG. 3 shows the Scanning Electron Microscopy (SEM) photo of the catalyst component according to Comparative Example 4.
Figure 4:
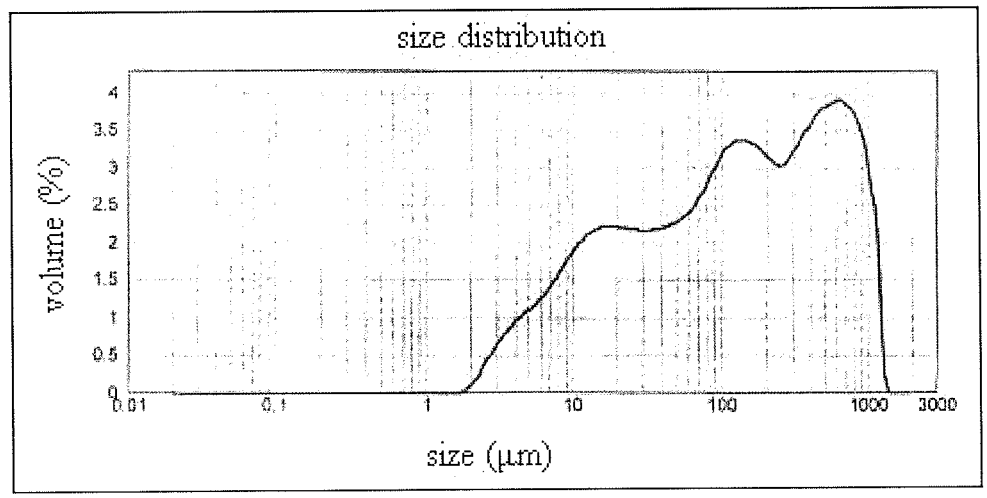
FIG. 4 shows the Particle size distribution diagram according to Comparative Example 4.

The amount of hexane solution (10 g/L) of polystyrene-polybutadiene triblock copolymer is changed from 2 ml to 3 ml, and the other conditions are the same as those in Example 10. The average particle size of the obtained catalyst components is 9.03 μm. The particle size distribution of the catalyst components is shown in FIG. 2.

Element analysis (ICP): 9.02 wt % of Ti, 12.75 wt % of Mg.

Ethylene polymerization evaluation methods A and B are the same as those in Example 1, and the polymerization results are as shown in Table 4. The sieving result of the polymer particle size distribution is as shown in Table 5.

Comparative Example 4

The conditions are the same as those in Example 10 except that 2 ml of hexane solution of polystyrene-polybutadiene triblock copolymer (Kraton, FG1901X, wherein the content of polybutadiene is 70%) is not added. The average particle size of the obtained catalyst is 124.8 μm, and the particle size distribution is wider, and multiple peaks are present.

Element analysis (ICP): 11.36 wt % of Ti, 12.89 wt % of Mg.

Ethylene polymerization evaluation methods A and B are the same as those in Example 1, and the polymerization results are as shown in Table 4.

TABLE 4

| | Polymerization type | Activity (Kg polymer/ g cat.) | MI$_{2.16}$ (g/10 min) | Block density (g/ml) |
|---|---|---|---|---|
| Example 10 | Ethylene A | 9.5 | 24.73 | 0.30 |
| | Ethylene B | 27.3 | 0.77 | 0.31 |
| Example 11 | Ethylene A | 14.0 | 38.41 | 0.30 |
| | Ethylene B | 72.2 | 1.41 | 0.32 |
| Example 12 | Ethylene A | 12.6 | 89.34 | 0.30 |
| | Ethylene B | 31.6 | 0.61 | 0.31 |
| | Propylene | 32.4 | 2.4 | 0.38 |
| Example 13 | Ethylene A | 22.9 | 70.54 | 0.29 |
| | Ethylene B | 48.4 | 2.77 | 0.30 |
| Comparative Example 4 | Ethylene A | 11.5 | 25.64 | 0.25 |
| | Ethylene B | 25.8 | 0.65 | 0.27 |

It can be seen from the data of the examples and comparative example in Table 4 that, when the polystyrene-polybutadiene triblock copolymers are used as a co-forming-precipitation agent in the preparation of catalyst, the particle size of the obtained catalyst and polymers is good, the particle size distribution is narrow, the block density (BD) of polymeric resin is high, and the catalyst comprehensive performance is good.

TABLE 5

| | Particle size distribution of polyethylene PE according to Example 13 (wt %) | | | | | | | |
|---|---|---|---|---|---|---|---|---|
| Polymerization condition | <20 mesh | 20-40 mesh | 40-60 mesh | 60-80 mesh | 80-100 mesh | 100-140 mesh | 140-200 mesh | >200 mesh |
| ethylene A | 1.04 | 2.94 | 14.12 | 48.80 | 22.35 | 7.44 | 2.28 | 1.03 |
| ethylene B | 1.61 | 2.93 | 40.40 | 40.56 | 10.12 | 3.03 | 1.01 | 0.35 |

It can be seen from the data of Table 5 that, the polymer particles of the catalyst prepared in Example 13 are mainly concentrated within 40 to 100 meshes, the distribution of which is concentrated, and the fine powder is less. The analysis result of sieving result of the polymer particle size distribution of said catalyst is the same as that of the particle size distribution figure (FIG. 2).

Example 14

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then after 0.2 ml of benzoyl chloride and 3 ml of hexane solution (10 g/L) of the polystyrene-polybutadiene triblock copolymer (Kraton, FG1901X, in which the content of polybutadiene is 70%) are added, the temperature is decreased to −50° C., and 1.6 ml of hexane solution of ethyl aluminum dichloride (2M) and 0.35 ml of titanium tetrachloride are added in sequence. After the reaction is kept for 0.5 h at a low temperature, the temperature is increased slowly and naturally to room temperature, and then the reaction is carried out for 2 h at 50° C. The temperature of the catalyst suspension is decreased to room temperature, stood and precipitated, and then washed with hexane for 3 times with an amount of 50 ml each time. After the washing is completed, brown solid fluidity powders are obtained by drying with an average particle size of 8.74 μm.

Element analysis (ICP): 10.58 wt % of Ti, 13.61 wt % of Mg.

Ethylene polymerization evaluation methods A and B are the same as those in Example 1, and the polymerization results are as shown in Table 6.

Example 15

The amount of benzoyl chloride in the catalyst preparation is changed from 0.2 ml to 0.5 ml, and the hexane solution of ethyl aluminum dichloride is changed to the hexane solution of isobutyl aluminum dichloride. Other conditions are the same as those in Example 14, and the average particle size is 13.2 μm.

Element analysis (ICP): 9.66 wt % of Ti, 12.13 wt % of Mg.

Ethylene polymerization evaluation methods A and B are the same as those in Example 1, and the polymerization results are as shown in Table 6.

Example 16

0.2 ml of benzoyl chloride in the catalyst preparation is changed to 0.2 ml of acetyl chloride, and other conditions are the same as that in Example 14. The average particle size is 7.94 μm.

Element analysis (ICP): 10.02 wt % of Ti, 13.54 wt % of Mg.

Ethylene polymerization evaluation methods A and B are the same as those in Example 1, and the polymerization results are as shown in Table 6.

Example 13' (Comparative)

0.2 ml of benzoyl chloride is not added in the catalyst preparation, and the other conditions are the same as those in Example 14. The average particle size is 9.04 μm.

TABLE 6

| | Polymerization type | Activity (Kg polymer/ g cat.) | $MI_{2.16}$ (g/10 min) | Block density (g/ml) |
|---|---|---|---|---|
| Example 14 | ethylene A | 24.2 | 105.24 | 0.30 |
| | ethylene B | 39.6 | 3.17 | 0.30 |
| Example 15 | ethylene A | 27.5 | 118.3 | 0.29 |
| | ethylene B | 41.3 | 3.58 | 0.31 |
| Example 16 | ethylene A | 23.8 | 91.3 | 0.30 |
| | ethylene B | 37.9 | 2.98 | 0.31 |
| Example 13' (Comparative) | ethylene A | 22.9 | 70.54 | 0.29 |
| | ethylene B | 48.4 | 2.77 | 0.30 |

It can be seen from the data of the examples and comparative example in Table 6 that, when the acyl chloride compound and SBS co-forming-precipitation agent are used in the preparation of catalyst, the particle shape of the obtained catalyst and polymers is good, the particle size distribution is narrow; the hydrogen response of polymeric resin is better; the catalyst comprehensive performance is good, which is beneficial for developing new resin products with unique properties.

Example 17

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 0.7 ml of tetraethyl orthosilicate and 3 ml of hexane solution (10 g/L) of polystyrene-polybutadiene triblock copolymer (Kraton, FG1901X, in which the content of polybutadiene is 70%) are added, the temperature is decreased to −50° C., and 1.6 ml of hexane solution of ethyl aluminum dichloride (2M) and 0.35 ml of titanium tetrachloride are added in sequence. After the reaction is kept for 0.5 h at a low temperature, the temperature is increased slowly and naturally to room temperature, and then the reaction is carried out for 2 h at 50° C. The temperature of the catalyst suspension is decreased to room temperature, stood and precipitated, and then washed with hexane for 3 times with an amount of 50 ml each time. After the washing is completed, brown solid fluidity powders are obtained by drying with an average particle size is 11.5 μm.

Element analysis (ICP): 10.13 wt % of Ti, 8.57 wt % of Mg.

Ethylene polymerization evaluation methods A and B are the same as those in Example 1, and the polymerization results are as shown in Table 7.

Example 18

The amount of tetraethyl orthosilicate in the catalyst preparation is changed from 0.7 ml to 1.0 ml, and "the reaction is kept for 0.5 h at a low temperature, and the temperature is increased slowly and naturally to room temperature" is adjusted to "the temperature is increased to 50° C. within 10 min after the feeding", with other conditions are being the same as those in Example 17. The average particle size is 24.7 μm.

Element analysis (ICP): 10.33 wt % of Ti, 12.46 wt % of Mg.

Ethylene polymerization evaluation methods A and B are the same as those in Example 1, and the polymerization results are as shown in Table 7.

Example 19

The amount of isooctanol in catalyst preparation is changed from 1.0 ml to 0.5 ml, the amount of tetraethyl orthosilicate is changed from 0.7 ml to 1.0 ml, and the other conditions are the same as those in Example 17. The average particle size is 15.9 μm.

Element analysis (ICP): 8.89 wt % of Ti, 11.09 wt % of Mg.

Ethylene polymerization evaluation methods A and B are the same as those in Example 1, and the polymerization results are as shown in Table 7.

Example 13" (Comparative)

0.7 ml of tetraethyl orthosilicate is not added in the catalyst preparation, and other conditions are the same as those in Example 17. The average particle size is 9.03 μm.

Comparative Example 5

The hexane solution of polystyrene-polybutadiene triblock copolymer is not added in catalyst preparation, and other conditions are the same as those in Example 17. The average particle size of the obtained catalyst is 93.35 μm, and the particle size distribution is a wider multimodal distribution.

Element analysis (ICP): 9.24 wt % of Ti, 12.92 wt % of Mg.

Ethylene polymerization evaluation methods A and B are the same as those in Example 1, and the polymerization results are as shown in Table 7.

TABLE 7

|  | Polymerization type | Activity (Kg polymer/ g cat.) | $MI_{2.16}$ (g/10 min) | Block density (g/ml) |
|---|---|---|---|---|
| Example 17 | ethylene A | 3.1 | 21.01 | 0.34 |
|  | ethylene B | 16.1 | 0.80 | 0.35 |
| Example 18 | ethylene A | 5.4 | 85.83 | 0.33 |
|  | ethylene B | 15.2 | 2.40 | 0.37 |
| Example 19 | ethylene A | 6.8 | 18.7 | 0.34 |
|  | ethylene B | 12.2 | 0.65 | 0.36 |
| Example 13" (Comparative) | ethylene A | 22.9 | 70.54 | 0.29 |
|  | ethylene B | 48.4 | 2.77 | 0.30 |
| Comparative Example 5 | ethylene A | 2.9 | 18.47 | 0.28 |
|  | ethylene B | 11.3 | 0.69 | 0.28 |

It can be seen from the data of the examples and comparative example in Table 7 that, when the silane compounds are used in the preparation of catalyst, the particle shape of the obtained catalyst and polymers is good, the particle size distribution is narrow, the block density (BD) of polymeric resin is high, and the catalyst comprehensive performance is good.

Example 20

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 3 ml of hexane solution (10 g/L) of polybutadiene-block-polyethylene oxide copolymer (the content of polybutadiene is 45 wt %) is added, the temperature is decreased to −50° C., and 3.15 ml of boron trichloride and 0.35 ml of titanium tetrachloride are added in sequence. After the feeding is completed, the temperature is increased quickly to 50° C. within 10 min and the reaction is kept for 2 h. The temperature of the catalyst suspension is decreased to room temperature, stood and precipitated, and then washed with hexane for 3 times with an amount of 50 ml each time. After the washing is completed, brown solid fluidity powders are obtained by drying with an average particle size of 33.6 μm.

Element analysis (ICP): 11.53 wt % of Ti, 15.69 wt % of Mg.

Ethylene polymerization evaluation methods A and B are the same as those in Example 1, and the polymerization results are as shown in Table 8.

Example 21

The amount of titanium tetrachloride in catalyst preparation is changed from 0.35 ml to 1 ml, and the other conditions are the same as those in Example 20. The average particle size is 25.8 μm.

Element analysis (ICP): 11.27 wt % of Ti, 13.05 wt % of Mg.

Ethylene polymerization evaluation methods A and B are the same as those in Example 1, and the polymerization results are as shown in Table 8.

Example 22

The content of polybutadiene in the polybutadiene-block-polyethylene oxide copolymer used in the catalyst preparation is changed from 45 wt % to 75 wt %, and other conditions are the same as those in Example 20. The average particle size is 15.9 μm.

Element analysis (ICP): 10.12 wt % of Ti, 14.32 wt % of Mg.

Ethylene polymerization evaluation methods A and B are the same as those in Example 1, and the polymerization results are as shown in Table 8.

Comparative Example 1'

The hexane solution of polybutadiene-block-polyethylene oxide copolymer is not added in the catalyst preparation, and the other conditions are the same as those in Example 20. The average particle size of the obtained catalyst is 68.53 μm, and the particle size distribution is a wider multimodal distribution.

TABLE 8

|  | Polymerization type | Activity (Kg polymer/ g cat.) | $MI_{2.16}$ (g/10 min) | Block density (g/ml) |
|---|---|---|---|---|
| Example 20 | ethylene A | 5.4 | 93.26 | 0.29 |
|  | ethylene B | 19.7 | 2.08 | 0.31 |
| Example 21 | ethylene A | 8.9 | 89.42 | 0.31 |
|  | ethylene B | 27.8 | 1.67 | 0.32 |
| Example 22 | ethylene A | 9.5 | 83.45 | 0.31 |
|  | ethylene B | 32.6 | 1.03 | 0.32 |
| Comparative Example 1' | ethylene A | 5.7 | 72.59 | 0.28 |
|  | ethylene B | 18.5 | 1.72 | 0.28 |

It can be seen from the data of the examples and comparative example in Table 8 that, when the SBS modified additives are used in the preparation of catalyst, the particle shape of the obtained catalyst and polymers is good, the particle size distribution is narrow, the block density (BD) of polymeric resin is high, and the catalyst comprehensive performance is good.

Example 23

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 2 ml of hexane solution (10 g/L) of the polybutadiene-block-polyethylene oxide copolymer (the content of polybutadiene is 75 wt %) is added, the temperature is decreased to −50° C., and 0.6 ml of phosphorus trichloride and 0.35 ml of titanium tetrachloride are added in sequence. After the feeding is completed, the temperature is increased quickly to 50° C. within 10 min and the reaction is kept for 2 h. The temperature of the catalyst suspension is decreased to room temperature, stood and precipitated, and then washed with hexane for 3 times with an amount of 50 ml each time. After the washing is completed, brown solid fluidity powders are obtained by drying with an average particle size of 15.7 μm.

Element analysis (ICP): 9.35 wt % of Ti, 13.14 wt % of Mg.

Ethylene polymerization evaluation methods A and B are the same as those in Example 1, and the polymerization results are as shown in Table 9.

Example 24

The amount of hexane solution of polybutadiene-block-polyethylene oxide copolymers is changed from 2 ml to 6 ml, and 0.6 ml of phosphorus trichloride is changed to 0.6 ml of phosphorus oxychloride. The other conditions are the same as those in Example 23, and the average particle size is 7.56 μm.

Element analysis (ICP): 11.37 wt % of Ti, 13.24 wt % of Mg.

Ethylene polymerization evaluation methods A and B are the same as those in Example 1, and the polymerization results are as shown in Table 9.

Example 25

The amount of isooctanol in the catalyst preparation is changed from 1.0 ml to 3.0 ml, "the temperature is increased quickly to 50° C. within 10 min" is changed to "the temperature is increased to room temperature slowly and then heated to 50° C.". The other conditions are the same as those in Example 23, and the average particle size is 14.6 μm.

Element analysis (ICP): 10.75 wt % of Ti, 14.18 wt % of Mg.

Ethylene polymerization evaluation methods A and B are the same as those in Example 1, and the polymerization results are as shown in Table 9.

Comparative Example 2'

The hexane solution of polybutadiene-block-polyethylene oxide copolymer is not added in the catalyst preparation, and the other conditions are the same as those in Example 23. The average particle size of the obtained catalyst is 64.76 μm, and the particle size distribution is a wider multimodal distribution.

TABLE 9

|  | Polymerization type | Activity (Kg polymer/ g cat.) | $MI_{2.16}$ (g/10 min) | Block density (g/ml) |
|---|---|---|---|---|
| Example 23 | ethylene A | 7.8 | 81.398 | 0.30 |
|  | ethylene B | 18.3 | 1.67 | 0.31 |
| Example 24 | ethylene A | 13.6 | 87.61 | 0.31 |
|  | ethylene B | 28.9 | 1.57 | 0.32 |
| Example 25 | ethylene A | 9.1 | 34.25 | 0.30 |
|  | ethylene B | 21.3 | 1.81 | 0.30 |
| Comparative Example 2' | ethylene A | 5.9 | 68.32 | 0.26 |
|  | ethylene B | 14.6 | 1.67 | 0.27 |

It can be seen from the data of the examples and comparative example in Table 9 that, when the polybutadiene-block-polyethylene oxide copolymers are used as modified additives in the preparation of catalyst, the particle shape of the obtained catalyst and polymers is good, the particle size distribution is narrow, the block density (BD) of polymeric resin is high, and the catalyst comprehensive performance is good.

Example 26

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 2 ml of hexane solution (10 g/L) of the polybutadiene-block-polyethylene oxide copolymer (the content of polybutadiene is 75 wt %) is added, the temperature is decreased to −10° C., and 0.36 ml of silicon tetrachloride and 0.35 ml of titanium tetrachloride are added in sequence. After the feeding is completed, the temperature is increased quickly to 50° C. within 10 min and the reaction is kept for 2 h. The temperature of the catalyst suspension is decreased to room temperature, stood and precipitated, and then washed with hexane for 3 times with an amount of 50 ml each time. After the washing is completed, brown solid fluidity powders are obtained by drying, with an average particle size of 37.4 μm.

Element analysis (ICP): 10.06 wt % of Ti, 19.29 wt % of Mg.

Ethylene polymerization evaluation methods A and B are the same as those in Example 1, and the polymerization results are as shown in Table 10.

Example 27

The step of "the temperature is increased quickly to 50° C. within 10 min in the catalyst preparation" is changed to the step of "the temperature is programmable increased to 50° C. within 120 min", and the other conditions are the same as those in Example 26. The average particle size is 43.7 μm.

Element analysis (ICP): 6.24 wt % of Ti, 13.55 wt % of Mg.

Ethylene polymerization evaluation methods A and B are the same as those in Example 1, and the polymerization results are as shown in Table 10.

Example 28

1.0 ml of isooctanol in the catalyst preparation is changed to 0.6 ml of n-butanol, the amount of hexane solution (10 g/L) of the polybutadiene-block-polyethylene oxide copolymer is changed from 2 ml to 10 ml, and the other conditions are the same as those in Example 26. The average particle size is 18.7 μm.
Element analysis (ICP): 11.54 wt % of Ti, 23.69 wt % of Mg.
Ethylene polymerization evaluation methods A and B are the same as those in Example 1, and the polymerization results are as shown in Table 10.

Comparative Example 3'

The hexane solution of polybutadiene-block-polyethylene oxide copolymer is not added in the catalyst preparation, and the other conditions are the same as those in Example 26. The average particle size of the obtained catalyst is 79.46 μm, and the particle size distribution is a wider multimodal distribution.

TABLE 10

|  | Polymerization type | Activity (Kg polymer/ g cat.) | $MI_{2.16}$ (g/10 min) | Block density (g/ml) |
|---|---|---|---|---|
| Example 26 | ethylene A | 8.6 | 101.5 | 0.33 |
|  | ethylene B | 27.7 | 2.32 | 0.34 |
| Example 27 | ethylene A | 6.1 | 74.36 | 0.31 |
|  | ethylene B | 10.7 | 1.85 | 0.31 |
| Example 28 | ethylene A | 11.4 | 105.7 | 0.34 |
|  | ethylene B | 32.7 | 1.99 | 0.34 |
| Comparative Example 3' | ethylene A | 6.4 | 87.38 | 0.28 |
|  | ethylene B | 22.6 | 1.49 | 0.29 |

It can be seen from the data of the examples and comparative example in Table 10 that, when the polybutadiene-block-polyethylene oxide copolymers are used in the preparation of catalyst, the particle shape of the obtained catalyst and polymers is good, the particle size distribution is narrow, the block density (BD) of polymeric resin is high, and the catalyst comprehensive performance is good.

Example 29

30 ml of hexane, 3.15 ml of hexane solution of dibutyl magnesium (1M) and 1.0 ml of isooctanol are added in sequence and mixed, the temperature is increased to 50° C. and the reaction is kept for 0.5 h under stirring to obtain a transparent solution. Then 3 ml of hexane solution (10 g/L) of polybutadiene-block-polyethylene oxide copolymer (the content of polybutadiene is 75 wt %) is added, the temperature is decreased to −50° C., and 1.6 ml of hexane solution of ethyl aluminum dichloride (2M) and 0.35 ml of titanium tetrachloride are added in sequence. After the reaction is kept for 0.5 h at a low temperature, the temperature is slowly and naturally increased to room temperature. Then the reaction is carried out for 2 h at 50° C. The temperature of the catalyst suspension is decreased to room temperature, stood and precipitated, and then washed with hexane for 3 times, with an amount of 50 ml each time. After the washing is completed, brown solid fluidity powders are obtained by drying, with an average particle size of 17.3 μm.
Element analysis (ICP): 10.83 wt % of Ti, 13.57 wt % of Mg.
Ethylene polymerization evaluation methods A and B are the same as those in Example 1, and the polymerization results are as shown in Table 11.

Example 30

The amount of hexane solution (10 g/L) of polybutadiene-block-polyethylene oxide copolymer is changed from 3 ml to 6 ml, and the other conditions are the same as those in Example 29. The average particle size is 5.68 μm.
Element analysis (ICP): 10.34 wt % of Ti, 14.02 wt % of Mg.
Ethylene polymerization evaluation methods A and B are the same as those in Example 1, and the polymerization results are as shown in Table 11.

Example 31

The step in the catalyst preparation of "the reaction is kept for 0.5 h at a low temperature, and the temperature is increased slowly and naturally to room temperature" is adjusted to the step of "after the feeding is completed, the temperature is increased to 50° C. within 10 min", and the other conditions are the same as those in Example 29. The average particle size is 23.7 μm.
Element analysis (ICP): 12.36 wt % of Ti, 10.57 wt % of Mg.
Ethylene polymerization evaluation methods A and B are the same as those in Example 1, and the polymerization results are as shown in Table 11.
Propylene polymerization evaluation method is the same as that in Example 12: into a 2 L steel reactor which is fully replaced by propylene gas, 800 ml of hexane, 2.5 mmol of triethyl aluminum, 0.125 mmol of diphenyl dimethoxy silane (DDS) and 20 mg of catalyst components prepared in Example 3 are added, then 0.4 NL (standard liter) hydrogen is added, and then propylene is fed to keep the pressure in the reactor at 0.6 MPa when the temperature is increased to 70° C. The polymerization is carried out for 2 h, then the pressure is released and the products are discharged. The congruent isotacticity of the obtained polymers (the content of the residual substance after extracted with boiling heptane) is 95.3%, and the specific polymerization results are shown in Table 11.

Comparative Example 4'

The conditions are the same as those in Example 29 except that the hexane solution of the polybutadiene-block-polyethylene oxide copolymer is not added. The average particle size of the obtained catalyst is 124.4 μm, and the particle size distribution is wider, and multiple peaks are present.

TABLE 11

|  | Polymerization type | Activity (Kg polymer/ g cat.) | $MI_{2.16}$ (g/10 min) | Block density (g/ml) |
|---|---|---|---|---|
| Example 29 | ethylene A | 9.3 | 35.64 | 0.32 |
|  | ethylene B | 28.5 | 1.09 | 0.32 |
| Example 30 | ethylene A | 15.8 | 40.56 | 0.31 |
|  | ethylene B | 53.7 | 1.25 | 0.32 |

TABLE 11-continued

|  | Polymerization type | Activity (Kg polymer/ g cat.) | MI$_{2.16}$ (g/10 min) | Block density (g/ml) |
|---|---|---|---|---|
| Example 31 | ethylene A | 11.7 | 78.84 | 0.31 |
|  | ethylene B | 32.3 | 0.89 | 0.33 |
|  | Propylene | 35.6 | 1.98 | 0.40 |
| Comparative Example 4' | ethylene A | 11.5 | 25.64 | 0.25 |
|  | ethylene B | 25.8 | 0.65 | 0.27 |

It can be seen from the data of the examples and comparative example in Table 4 that, when the polybutadiene-block-polyethylene oxide copolymers are used as modified additives in the preparation of catalyst, the particle shape of the obtained catalyst and polymers is well, the particle size distribution is narrow, the block density (BD) of polymeric resin is high, and the catalyst comprehensive performance is good.

Example 32

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 0.2 ml of benzoyl chloride and 3 ml of hexane solution (10 g/L) of the polybutadiene-block-polyethylene oxide copolymers (the content of polybutadiene is 75 wt %) are added, the temperature is decreased to −50° C., and 1.6 ml of hexane solution of ethyl aluminum dichloride (2M) and 0.35 ml of titanium tetrachloride are added in sequence. After the reaction is kept for 0.5 h at a low temperature, the temperature is increased slowly and naturally to room temperature, and then the reaction is carried out for 2 h at 50° C. The temperature of the catalyst suspension is decreased to room temperature, stood and precipitated, and then washed with hexane for 3 times, with an amount of 50 ml each time. After the washing is completed, brown solid fluidity powders are obtained by drying with an average particle size of 11.23 µm.

Element analysis (ICP): 11.14 wt % of Ti, 13.32 wt % of Mg.

Ethylene polymerization evaluation methods A and B are the same as those in Example 1, and the polymerization results are as shown in Table 12.

Example 33

The amount of benzoyl chloride in the catalyst preparation is changed from 0.2 ml to 0.5 ml, 1.6 ml of hexane solution of ethyl aluminum dichloride is changed to 1.6 ml of hexane solution of isobutyl aluminum dichloride, and the other conditions are the same as those in Example 32. The average particle size is 13.8 µm.

Element analysis (ICP): 10.18 wt % of Ti, 12.05 wt % of Mg.

Ethylene polymerization evaluation methods A and B are the same as those in Example 1, and the polymerization results are as shown in Table 12.

Example 34

0.2 ml of benzoyl chloride in the catalyst preparation is changed to 0.2 ml of acetyl chloride, and the other conditions are the same as those in Example 32. The average particle size is 9.88 µm.

Element analysis (ICP): 10.37 wt % of Ti, 12.89 wt % of Mg.

Ethylene polymerization evaluation methods A and B are the same as those in Example 1, and the polymerization results are as shown in Table 12.

Example 29' (Comparative)

The benzoyl chloride is not added in catalyst preparation, and the other conditions are the same as those in Example 32. The average particle size is 17.3 µm.

TABLE 12

|  | Polymerization type | Activity (Kg polymer/ g cat.) | MI$_{2.16}$ (g/10 min) | Block density (g/ml) |
|---|---|---|---|---|
| Example 32 | ethylene A | 18.2 | 93.69 | 0.30 |
|  | ethylene B | 33.5 | 3.06 | 0.30 |
| Example 33 | ethylene A | 24.7 | 98.8 | 0.29 |
|  | ethylene B | 38.2 | 3.36 | 0.31 |
| Example 34 | ethylene A | 21.6 | 86.7 | 0.30 |
|  | ethylene B | 36.4 | 2.78 | 0.30 |
| Example 29' (Comparative) | ethylene A | 9.3 | 35.64 | 0.32 |
|  | ethylene B | 28.5 | 1.09 | 0.32 |

It can be seen from the data of the examples and comparative example in Table 12 that, when the acyl chloride compounds are used in the preparation of catalyst, the particle shape of the obtained catalyst and polymers is well, the particle size distribution is narrow, the hydrogen response of polymeric resin and the catalyst comprehensive performance is good, which is beneficial for developing new resin products with unique properties.

Example 35

30 ml of hexane, 3.15 ml of hexane solution of dibutyl magnesium (1M) and 1.0 ml of isooctanol are weighed out in sequence and mixed, the temperature is increased to 50° C. and the reaction is kept for 0.5 h under stirring to obtain a transparent solution. Then 0.6 ml of tetraethyl orthosilicate and 3 ml of hexane solution (10 g/L) of polybutadiene-block-polyethylene oxide copolymer (the content of polybutadiene is 75 wt %) are added, the temperature is decreased to −50° C., and 1.6 ml of hexane solution of ethyl aluminum dichloride (2M) and 0.35 ml of titanium tetrachloride are added in sequence. After the reaction is kept for 0.5 h at a low temperature, the temperature is increased slowly and naturally to room temperature, and then the reaction is carried out for 2 h at 50° C. The temperature of the catalyst suspension is decreased to room temperature, stood and precipitated, and then washed with hexane for 3 times with an amount of 50 ml each time. After the washing is completed, brown solid fluidity powders are obtained by drying with an average particle size of 20.1 µm.

Element analysis (ICP): 11.63 wt % of Ti, 12.95 wt % of Mg.

Ethylene polymerization evaluation methods A and B are the same as those in Example 1, and the polymerization results are as shown in Table 13.

Example 36

The amount of tetraethyl orthosilicate in the catalyst preparation is changed from 0.6 ml to 1 ml, the step in the catalyst preparation of "after the reaction is kept for 0.5 h at a low temperature, the temperature is increased slowly and naturally to room temperature" is adjusted to the step of "after the feeding is completed, the temperature is increased to 50° C. within 10 min", and the other conditions are the same as those in Example 35. The average particle size is 27.6 μm.

Element analysis (ICP): 10.84 wt % of Ti, 12.12 wt % of Mg.

Ethylene polymerization evaluation methods A and B are the same as those in Example 1, and the polymerization results are as shown in Table 13.

Example 37

The amount of isooctanol in the catalyst preparation is changed from 1.0 ml to 0.5 ml, the amount of tetraethyl orthosilicate is changed from 0.7 ml to 1.0 ml, and the other conditions are the same as those in Example 35. The average particle size is 23.8 μm.

Element analysis (ICP): 9.72 wt % of Ti, 10.57 wt % of Mg.

Ethylene polymerization evaluation methods A and B are the same as those in Example 1, and the polymerization results are as shown in Table 13.

Example 29' (Comparative)

0.6 ml of tetraethyl orthosilicate is not added in the catalyst preparation, and the other conditions are the same as those in Example 35. The average particle size is 17.3 μm.

Comparative Example 5"

The hexane solution of polybutadiene-block-polyethylene oxide copolymer is not added in the catalyst preparation, and the other conditions are the same as those in Example 35. The average particle size of the obtained catalyst is 93.35 μm, and the particle size distribution is a wider multimodal distribution.

TABLE 13

|  | Polymerization type | Activity (Kg polymer/ g cat.) | MI2.16 (g/10 min) | Block density (g/ml) |
| --- | --- | --- | --- | --- |
| Example 35 | ethylene A | 4.6 | 23.27 | 0.35 |
|  | ethylene B | 21.3 | 0.76 | 0.36 |
| Example 36 | ethylene A | 7.8 | 91.39 | 0.34 |
|  | ethylene B | 21.6 | 2.32 | 0.36 |
| Example 37 | ethylene A | 7.1 | 17.4 | 0.34 |
|  | ethylene B | 12.8 | 0.68 | 0.35 |
| Example 29' | ethylene A | 9.3 | 35.64 | 0.32 |
| (Comparative) | ethylene B | 28.5 | 1.09 | 0.32 |
| Comparative | ethylene A | 2.9 | 18.47 | 0.28 |
| Example 5" | ethylene B | 11.3 | 0.69 | 0.28 |

It can be seen from the data of the examples and comparative example in Table 13 that, when the silane compounds are used in the preparation of catalyst, the particle shape of the obtained catalysts and polymers is good, the particle size distribution is narrow, the block density (BD) of polymeric resin is high, and the catalyst comprehensive performance is good.

The invention claimed is:

1. A catalyst component for olefin polymerization, comprising the reaction product of at least one organo-magnesium compound, at least one titanium-containing compound, at least one hydroxyl group-containing compound, at least one chlorine-containing organic compound, and at least one polybutadiene block copolymer, wherein said organo-magnesium compound is as shown in Formula (I) MgR$^1_n$Cl$_{2-n}$, wherein R$^1$ is a C$_2$-C$_{20}$ hydrocarbyl group, and can be saturated or unsaturated straight chain, branched chain, or cyclo-chain, and 0<n≤2;

wherein said titanium-containing compound is as shown in Formula (II) Ti(OR$^2$)$_m$Cl$_{4-m}$, wherein R$^2$ is C$_2$-C$_{20}$ hydrocarbyl group, and can be a saturated or unsaturated straight chain, branched chain, or cyclo-chain, and 0≤m≤4; and wherein said hydroxyl group-containing compound is as shown in Formula (III) HOR$^3$, wherein R$^3$ is a C$_2$-C$_{20}$ hydrocarbyl group, and can be a saturated or unsaturated straight chain, branched chain, or cyclo-chain.

2. The catalyst component according to claim 1, wherein said polybutadiene block copolymer is a polystyrene-block-polybutadiene copolymer or a polybutadiene-block-polyethylene oxide copolymer, and comprises a diblock copolymer, a triblock copolymer, and/or the derivative thereof, in which the block type can be optionally a linear type, a type comprising branched chain, or a star type, and the content of polybutadiene in said polybutadiene block copolymers ranges from 3 wt % to 97 wt %.

3. The catalyst component according to claim 1, wherein said organic chlorine-containing compound is a chlorine-containing organo-boron compound as shown in Formula (IV) BR$^4_p$Cl$_{3-p}$, wherein R$^4$ is C$_2$-C$_{20}$ alkyl or alkoxy group and 0≤p<3.

4. The catalyst component according to claim 1, wherein said chlorine-containing organic compound is a chlorine-containing organo-phosphorus compound, which is PCl$_5$ or the compound as shown in Formula (V) O$_d$PR$^5_q$Cl$_{3-q}$, wherein R$^5$ is C$_2$-C$_{20}$ alkyl or alkoxy group, 0≤q<3, and d is 0 or 1.

5. The catalyst component according to claim 1, wherein said chlorine-containing organic compound is a chlorine-containing organo-silicone compound as shown in Formula (VI) SiR$^6_e$Cl$_{4-e}$, wherein R$^6$ is C$_2$-C$_{20}$ alkyl or alkoxy group, and 0≤e<4.

6. The catalyst component according to claim 1, wherein said chlorine-containing organic compound is a chlorine-containing organo-aluminum compound as shown in Formula (VII) AlR$^7_f$Cl$_{3-f}$, wherein R$^7$ is C$_2$-C$_{20}$ hydrocarbyl group, and 0.5≤f≤2.5.

7. The catalyst component according to claim 1, wherein an acyl chloride compound is involved in the reaction to form the catalyst component, said acyl chloride compound being as shown in Formula (VIII) R$^8$COCl, wherein R$^8$ is C$_2$-C$_{20}$ hydrocarbyl group, and can be saturated or unsaturated straight chain, branched chain, or cyclo-chain.

8. The catalyst component according to claim 1, wherein a silane compound is involved in the reaction to form the catalyst component, said silane compound being as shown in Formula (IX) Si(OR$^9$)$_g$Cl$_{4-g}$, wherein R$^9$ is C$_2$-C$_{20}$ hydrocarbyl group, and can be saturated or unsaturated straight chain, branched chain, or cyclo-chain, and 0<g≤4.

9. The catalyst component according to claim 1, wherein in said organic magnesium compound as shown in Formula (I), R$^1$ is C$_2$-C$_{20}$ alkyl group.

10. The catalyst component according to claim 1, wherein in said titanium-containing compound as shown in Formula (II), m is 4 or 0.

11. The catalyst component according to claim 1, wherein said hydroxyl group-containing compound is selected from at least one of n-butanol, n-hexanol, isooctanol, benzyl alcohol, and phenyl ethanol.

12. A preparation method for said catalyst component according to claim 1, comprising the following steps:
   step a) reacting the organic magnesium compound with the hydroxyl group-containing compound to obtain a transparent solution;
   step b) dispersing the polybutadiene block copolymer in a $C_4$-$C_{20}$ alkane or aromatic solvent to form a solution, which is then reacted with the transparent solution obtained in step a) to obtain a mixture; and
   step c) adding the chlorine-containing organic compound and titanium-containing compound into the mixture obtained in step b) in sequence to obtain said catalyst component.

13. A preparation method for said catalyst component according to claim 7, comprising the following steps:
   step a) reacting the organo-magnesium compound with the hydroxyl group-containing compound to obtain a transparent solution;
   step b) dispersing the polybutadiene block copolymer in a $C_4$-$C_{20}$ alkane or aromatic solvent to form a solution, which is then reacted with said acyl chloride compound and the transparent solution obtained in step a) to obtain a mixture;
   step c) adding the chlorine-containing organic compound and titanium-containing compound into the mixture obtained in step b) in sequence to obtain said catalyst component.

14. A preparation method for said catalyst component according to claim 8, comprising the following steps:
   step a) reacting the organo-magnesium compound with the hydroxyl group-containing compound to obtain a transparent solution;
   step b) dispersing the polybutadiene block copolymer in a $C_4$-$C_{20}$ alkane or aromatic solvent to form a solution, which is then reacted with said silane compound and the transparent solution obtained in step a) to obtain a mixture;
   step c) adding the chlorine-containing organic compound and titanium-containing compound into the mixture obtained in step b) in sequence to obtain said catalyst component.

15. The preparation method according to claim 12, wherein calculated based on per mol of the organo-magnesium compound, the amount of said titanium-containing compound ranges from 0.01 mol to 10 mol, the amount of said hydroxyl group-containing compound ranges from 0.1 mol to 20 mol, the amount of said chlorine-containing organic compound ranges from 0.1 mol to 50 mol, and the content of said polybutadiene block copolymer in the reaction system is controlled within a range from 0.001 g/L to 100 g/L.

16. The preparation method according to claim 13, wherein calculated based on per mol of the organo-magnesium compound, the amount of said titanium-containing compound ranges from 0.01 mol to 10 mol, the amount of said hydroxyl group-containing compound ranges from 0.1 mol to 20 mol, the amount of said chlorine-containing organic compound ranges from 0.1 mol to 50 mol, the amount of said acyl chloride compound ranges from 0.001 mol to 20 mol, and the content of said polybutadiene block copolymer in the reaction system is controlled within a range from 0.001 g/L to 100 g/L.

17. The preparation method according to claim 14, wherein calculated based on per mol of the organo-magnesium compound, the amount of said titanium-containing compound ranges from 0.01 mol to 10 mol, the amount of said hydroxyl group-containing compound ranges from 0.1 mol to 20 mol, the amount of said chlorine-containing organic compound ranges from 0.1 mol to 50 mol, the amount of said silane compound ranges from 0.001 mol to 20 mol, and the content of said polybutadiene block copolymer in the reaction system is controlled within a range from 0.001 g/L to 100 g/L.

18. A catalyst for olefin homopolymerization or copolymerization comprising the reaction products of the following components,
   (a) said catalyst component for olefin polymerization according to claim 1; and
   (b) at least one of the organo-aluminum compounds as shown in Formula $AlR'''_3$, wherein $R'''_3$, which may be identical to or different from each other, can be $C_1$-$C_8$ alkyl groups, and one or two of which can be substituted by chlorine.

19. A method for olefin homopolymerization or copolymerization, comprising adding the catalyst according to claim 18 into an olefin homopolymerization or copolymerization reaction, wherein said olefin is ethylene, propylene, butylene, hexane, or octane.

20. The catalyst component according to claim 2, wherein the content of polybutadiene in said polybutadiene block copolymers ranges from 10 wt % to 90 wt %.

21. The catalyst component according to claim 3, wherein said chlorine-containing organo-boron compound is selected from at least one of dichloro-methyl boron, dichloro-ethyl boron, dichloro-butyl boron, dichloro-methoxy boron, dichloro-ethoxy boron, boron trichloride, and dichloro-butoxy boron.

22. The catalyst component according to claim 4, wherein said chlorine-containing organo-phosphorus compound is selected from at least one of dichloro-methyl phosphorus, dichloro-ethyl phosphorus, dichloro-butyl phosphorus, phosphorus trichloride, phosphorus pentachloride, phosphorus oxychloride, methyl dichlorophosphate, ethyl dichlorophosphate, and butyl dichlorophosphate.

23. The catalyst component according to claim 5, wherein said chlorine-containing organo-silicone compound is selected from at least one of trichloro-phenyl silane, trichloro-methyl silane, trichloro-ethyl silane, trichloro-octyl silane, trichloro-methoxy silane, trichloro-ethoxy silane, trichloro-butoxy silane, dichloro-dimethoxy silane, dichloro-diethoxy silane, and silicon tetrachloride.

24. The catalyst component according to claim 6, wherein $R^7$ is a $C_2$-$C_6$ straight chain or branched chain hydrocarbyl group.

25. The catalyst component according to claim 24, wherein said chlorine-containing organo-aluminum compound is selected from at least one of dichloro-ethyl aluminum, sesquiethyl aluminum chloride, diethyl aluminum chloride, and dichloro-isobutyl aluminum.

26. The catalyst component according to claim 7, wherein said acyl chloride compound is selected from at least one of formyl chloride, acetyl chloride, propionyl chloride, butyryl chloride, benzoyl chloride, phenylacetyl chloride, phenylpropionyl chloride, and phenylbutyryl chloride.

27. The catalyst component according to claim 8, wherein said silane compound is selected from at least one of chloro-trimethoxy silane, chloro-triethoxy silane, chloro-tributoxy silane, dichloro-dimethoxy silane, dichloro-diethoxy silane, dichloro-dibutoxy silane, tetraethyl orthosilicate, and tetrabutyl orthosilicate.

28. The catalyst component according to claim 9, wherein said organo-magnesium compound is selected from at least one of dibutyl magnesium, diisobutyl magnesium, dioctyl magnesium, butyl octyl magnesium, ethyl magnesium chloride, and butyl magnesium chloride.

29. The catalyst component according to claim 10, wherein said titanium-containing compound is selected from at least one of titanium tetrachloride, tetraethyl titanate, and tetrabutyl titanate.

30. The preparation method according to claim 15, wherein calculated based on per mol of the organo-magnesium compound, the amount of said titanium-containing compound ranges from 0.05 mol to 5 mol, the amount of said hydroxyl group-containing compound ranges from 0.2 mol to 10 mol, the amount of said chlorine-containing organic compound ranges from 0.5 mol to 20 mol, and the content of said polybutadiene block copolymer in the reaction system is controlled within a range from 0.01 g/L to 50 g/L.

31. The preparation method according to claim 16, wherein calculated based on per mol of the organo-magnesium compound, the amount of said titanium-containing compound ranges from 0.05 mol to 5 mol, the amount of said hydroxyl group-containing compound ranges from 0.2 mol to 10 mol, the amount of said chlorine-containing organic compound ranges from 0.5 mol to 20 mol, the amount of said acyl chloride compound ranges from 0.01 mol to 10 mol, and the content of said polybutadiene block copolymer in the reaction system is controlled within a range from 0.01 g/L to 50 g/L.

32. The preparation method according to claim 17, wherein calculated based on per mol of the organo-magnesium compound, the amount of said titanium-containing compound ranges from 0.05 mol to 5 mol, the amount of said hydroxyl group-containing compound ranges from 0.2 mol to 10 mol, the amount of said chlorine-containing organic compound ranges from 0.5 mol to 20 mol, the amount of said silane compound ranges from 0.01 mol to 10 mol, and the content of said polybutadiene block copolymer in the reaction system is controlled within a range from 0.01 g/L to 50 g/L.

* * * * *

UNITED STATES PATENT AND TRADEMARK OFFICE
CERTIFICATE OF CORRECTION

PATENT NO. : 9,068,025 B2  
APPLICATION NO. : 13/817610  
DATED : June 30, 2015  
INVENTOR(S) : Shibo Wang et al.

Page 1 of 1

It is certified that error appears in the above-identified patent and that said Letters Patent is hereby corrected as shown below:

Title page, item 54, and in the specification, column 1, lines 1-3, "CATALYST COMPONENT FOR POLYMERIZATION OF OLEFIN AND PREPARATION METHOD" should read -- CATALYST COMPONENT FOR POLYMERIZATION OF OLEFIN AND PREPARATION METHOD THEREOF --.

IN THE CLAIMS

Claim 1, col. 24, lines 7-8, "$R^2$ is $C_2$-$C_{20}$ hydrocarbyl group" should read -- $R^2$ is a $C_2$-$C_{20}$ hydrocarbyl group --.

Claim 3, col. 24, line 28, "$R^4$ is $C_2$-$C_{20}$ alkyl" should read -- $R^4$ is a $C_2$-$C_{20}$ alkyl --.

Claim 4, col. 24, line 34, "$R^5$ is $C_2$-$C_{20}$ alkyl" should read -- $R^5$ is a $C_2$-$C_{20}$ alkyl --.

Claim 5, col. 24, line 39, "$R^6$ is $C_2$-$C_{20}$ alkyl" should read -- $R^6$ is a $C_2$-$C_{20}$ alkyl --.

Claim 6, col. 24, lines 44-45, "$R^7$ is $C_2$-$C_{20}$ hydrocarbyl group" should read -- $R^7$ is a $C_2$-$C_{20}$ hydrocarbyl group --.

Claim 7, col. 24, lines 49-50, "$R^8$ is $C_2$-$C_{20}$ hydrocarbyl group" should read -- $R^8$ is a $C_2$-$C_{20}$ hydrocarbyl group --.

Claim 8, col. 24, lines 55-56, "$R^9$ is $C_2$-$C_{20}$ hydrocarbyl group" should read -- $R^9$ is a $C_2$-$C_{20}$ hydrocarbyl group --.

Claim 9, col. 24, line 60, "$R^1$ is $C_2$-$C_{20}$ alkyl group" should read -- $R^1$ is a $C_2$-$C_{20}$ alkyl group --.

Signed and Sealed this  
Nineteenth Day of January, 2016

Michelle K. Lee  
*Director of the United States Patent and Trademark Office*